United States Patent
Holung et al.

[11] Patent Number: 6,141,216
[45] Date of Patent: Oct. 31, 2000

[54] QUICK-RELEASE HINGE JOINT FOR HEAT PIPE

[75] Inventors: Joseph Anthony Holung, Wake Forest; Tin-Lup Wong, Chapel Hill; Vinod Kamath, Raleigh, all of N.C.

[73] Assignee: International Business Machines Corporation, Armonk, N.Y.

[21] Appl. No.: 09/282,889

[22] Filed: Mar. 31, 1999

[51] Int. Cl.[7] .............................. G06F 1/20; H05K 7/20; F28D 15/00
[52] U.S. Cl. ........................... 361/687; 361/700; 165/86; 165/104.33
[58] Field of Search ........................... 361/687, 694–703, 361/701, 717–719, 700; 437/209, 221, 222; 438/106, 118, 584, 675; 364/708.1; 29/832, 841, 854, 729, 739; 62/259.2; 165/80.3, 104.33, 80.4, 185, 104.21–104.26, 104.29, 86

[56] References Cited

U.S. PATENT DOCUMENTS

| | | | |
|---|---|---|---|
| 3,831,664 | 8/1974 | Pogson ..................................... | 165/80 |
| 4,345,642 | 8/1982 | Ernst et al. ............................... | 165/86 |
| 4,500,279 | 2/1985 | Devellian et al. . | |
| 5,513,070 | 4/1996 | Xie et al. . | |
| 5,549,155 | 8/1996 | Meyer, IV et al. ................ | 165/104.33 |
| 5,588,483 | 12/1996 | Ishida ...................................... | 165/86 |
| 5,598,320 | 1/1997 | Toedtman et al. ...................... | 361/687 |
| 5,621,613 | 4/1997 | Haley et al. ............................. | 361/687 |
| 5,634,351 | 6/1997 | Larson et al. . | |
| 5,646,822 | 7/1997 | Bhatia et al. ............................ | 361/687 |
| 5,718,282 | 2/1998 | Bhatia et al. . | |
| 5,725,050 | 3/1998 | Meyer, IV et al. . | |
| 5,781,409 | 7/1998 | Mecredy, III . | |
| 5,796,581 | 8/1998 | Mok ......................................... | 361/687 |
| 5,818,693 | 10/1998 | Garner et al. . | |
| 5,822,187 | 10/1998 | Garner et al. ............................. | 36/687 |
| 5,826,645 | 10/1998 | Meyer, IV et al. ................ | 165/104.33 |
| 5,835,348 | 11/1998 | Ishida . | |
| 5,880,929 | 3/1999 | Bhatia ..................................... | 361/687 |
| 5,910,883 | 6/1999 | Cipolla et al. .......................... | 361/687 |
| 5,975,195 | 11/1999 | Lowry et al. ............................. | 165/86 |

OTHER PUBLICATIONS

YO998–171 Computer Incorporating Heat Dissipator with Hinged Heat Pipe Arrangement for Enhanced Cooling Capacity.

*Primary Examiner*—Leo P. Picard
*Assistant Examiner*—Anatoly Vortman
*Attorney, Agent, or Firm*—Anthony N. Magistrale; Felsman, Bradley, Vaden, Gunter & Dillon, LLP

[57] ABSTRACT

A notebook computer has a base and a cover that is pivotally mounted to the base with a hinge. An integrated circuit chip is mounted to the base and has one end of a heat pipe attached to it or to an associated heat dissipation device. The other end of the heat pipe lies along the hinge. A spreader plate is mounted in the cover and attached to the other end of the heat pipe to form a nested, rotational joint. One end of the plate is located along the hinge and formed into a slotted cylinder. The heat pipe is pressed into the slot to form the joint which is tight around the heat pipe, but still allows it to rotate to accommodate the pivot motion of the cover. A retainer may be incorporated into the design to further enhance the strength of the joint and assure thermal continuity. The retainer is a hollow cylinder with an axial slit through which the plate extends.

13 Claims, 2 Drawing Sheets

QUICK-RELEASE HINGE JOINT FOR HEAT PIPE

BACKGROUND OF THE INVENTION

1. Technical Field

This invention relates in general to remotely cooling a heat-generating component and in particular to a quick-release, hinge-like joint for a heat pipe in a notebook computer.

2. Background Art

Thermal management considerations pertinent to high performance notebook computer applications make it very desirable to use a heat pipe to cool a chip located in the base of the unit by transferring or dissipating heat to the large surface area that is available in the top cover. Since the top cover opens and closes relative to the base, there is a rotational hinge joint at the interface connecting the base to the cover that must be traversed by the cooling scheme.

A commonly employed cooling scheme utilizes one heat pipe in the cover and a second heat pipe in the base. The heat pipes are typically fragile, thin-walled cylinders which are sealed on each end and contain a vapor such as water. The heat pipes thermally communicate with one another via a hinge joint along the hinge axis. There are several prior art hinge joint designs currently in use. Each of these designs share a necessary common feature: they allow rotation of the cylindrical heat pipe within a bore or hollow sleeve. Until now, this limitation has required very tight tolerances and relatively elaborate fastening mechanisms to achieve the thermal hinge joint.

For effective heat transfer to take place at the joint, the cylindrical surface of the heat pipe must be in intimate communication within the bore of the hinge. That is, a minimum diametrical clearance, on the order of 25 micrometers or less, is required at the interface. In some cases, thermal grease is employed at the interface to obtain improved thermal conduction through the joint and to reduce friction between the two members. Unfortunately, even the use of thermal grease requires reasonably tight tolerances at the hinge. Thus, coupling tight tolerances with the fragile heat pipe has not substantially diminished the manufacturing and assembly difficulties of the thermal hinge. Moreover, none of these designs allow a quick assembly or disassembly of the components to the base and cover. Therefore, it is a feature of the present invention to overcome the difficulties of the prior art thermal hinges described by providing an improved heat pipe hinge joint.

SUMMARY OF THE INVENTION

A notebook computer has a base and a cover that is pivotally mounted to the base with a hinge. An integrated circuit chip is mounted to the base and has one end of a heat pipe attached to it or to an associated heat dissipation device. The other end of the heat pipe lies along the hinge. A spreader plate is mounted in the cover and attached to the other end of the heat pipe to form a nested, rotational joint. One end of the plate is located along the hinge and formed into a slotted cylinder. The heat pipe is pressed into the slot to form the joint which is tight around the heat pipe, but still allows it to rotate to accommodate the pivot motion of the cover. A retainer may be incorporated into the design to further enhance the strength of the joint and assure thermal continuity. The retainer is a hollow cylinder with an axial slit through which the plate extends.

BEST MODE FOR CARRYING OUT THE INVENTION

Figure 1:
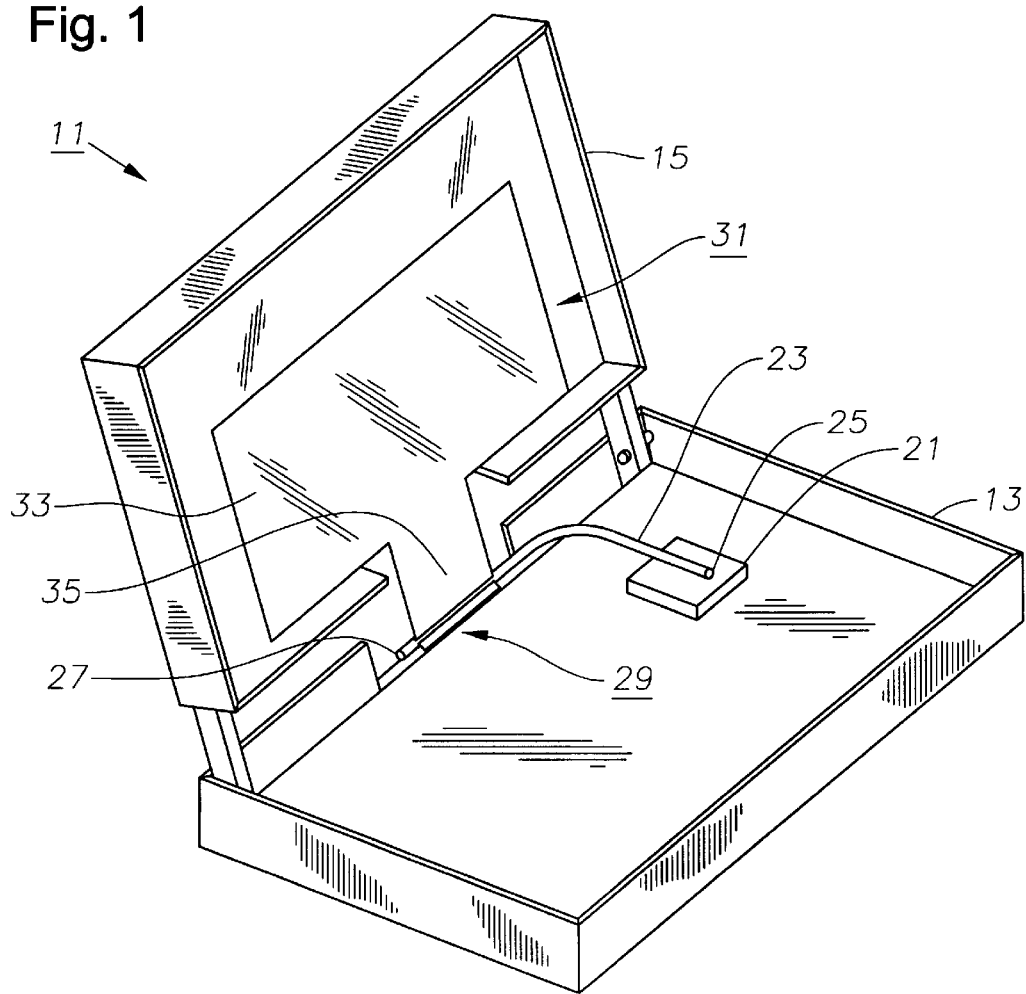
FIG. 1 is a schematic drawing of a notebook computer having a heat pipe joint constructed in accordance with the invention.

Referring to FIG. 1, a notebook computer 11 having a base 13 and lid or cover 15 is shown. Cover 15 is pivotally mounted to base 13 and is movable between an open position (shown) and a closed position (not shown). For simplicity, many of the conventional elements of computer 11, such as a display, keyboard and electrical components, have been removed for ease of understanding the invention.

An integrated circuit or chip 21 is mounted in base 13 and has a heat pipe 23 attached to it, or to an associated heat dissipation device such as a heat sink or spreader plate. Chip 21 may comprise many different forms of processors or circuits. The embodiment shown in FIG. 1 is for illustration purposes only. Heat pipe 23 is a generally conventional, elongated cylindrical tube that is sealed at each end. Heat pipe 23 may be formed from a highly thermal conductive material such as copper. Heat pipe 23 is hollow and contains a vapor such as water for increased conductivity. In the embodiment shown, heat pipe 23 is shaped into a 90 degree elbow with one end 25 on chip 21 and an opposite end 27 located along the rear edge of base 13.

Figure 2:
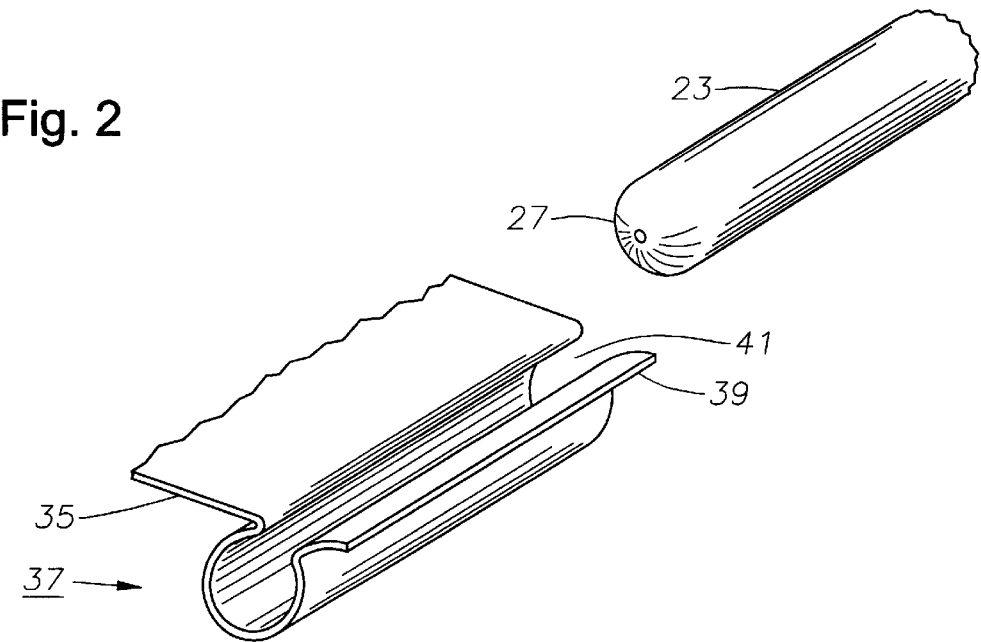
FIG. 2 is an enlarged, exploded isometric view of a first embodiment of the heat pipe joint of FIG. 1.

A spreader plate 31 is attached to heat pipe 23 near end 27 to form a joint 29 which is located remotely relative to chip 21. Plate 31 is constructed of highly thermal conductive sheet material such as copper, aluminum or a carbon composite, to name a few. Plate 31 has a large rectangular body 33 and an extension 35 protruding therefrom. Extension 35 is formed or curled into a cylinder 37 on its distal end (FIG. 2). Cylinder 37 is open on both of its axial ends, and has a curved lip 39 along its side or distal edge which curves away from extension 35. A narrow opening or slot 41 is defined between extension 35 and lip 39. Slot 41 provides an opening to the interior of cylinder 37 for accepting end 27 of heat pipe 23 in a nesting relationship. In FIG. 2, joint 29 is shown in a disconnected state.

The connection between heat pipe 23 and cylinder 37 forms joint 29 by radially pressing heat pipe 23 into cylinder 39 while their respective axes are substantially parallel. As heat pipe 23 is forced into slot 41, lip 39 separates or spreads somewhat from extension 35 to accommodate it. The elastic property of the sheet material causes cylinder 37 to spring back to envelop heat pipe 23 at full engagement. If necessary, a secondary guide member (not shown) may be used to open joint 29 and carry the compressive load in cylinder 37 to protect the fragile heat pipe 23. The inner diameter of cylinder 37 is dimensioned such that a tight fit is achieved around heat pipe 23 once it is inserted into slot 41. Since the cylindrical heat pipe 23 can rotate relative to the axis of cylinder 37, joint 29 is preferably axially positioned along the axis of the hinge of computer 11 to function as a thermal hinge joint. Heat generated by chip 21 is conducted away through heat pipe 23 and joint 29, and into spreader plate 31 to dissipate the heat remotely relative to chip 21.

Figure 3:
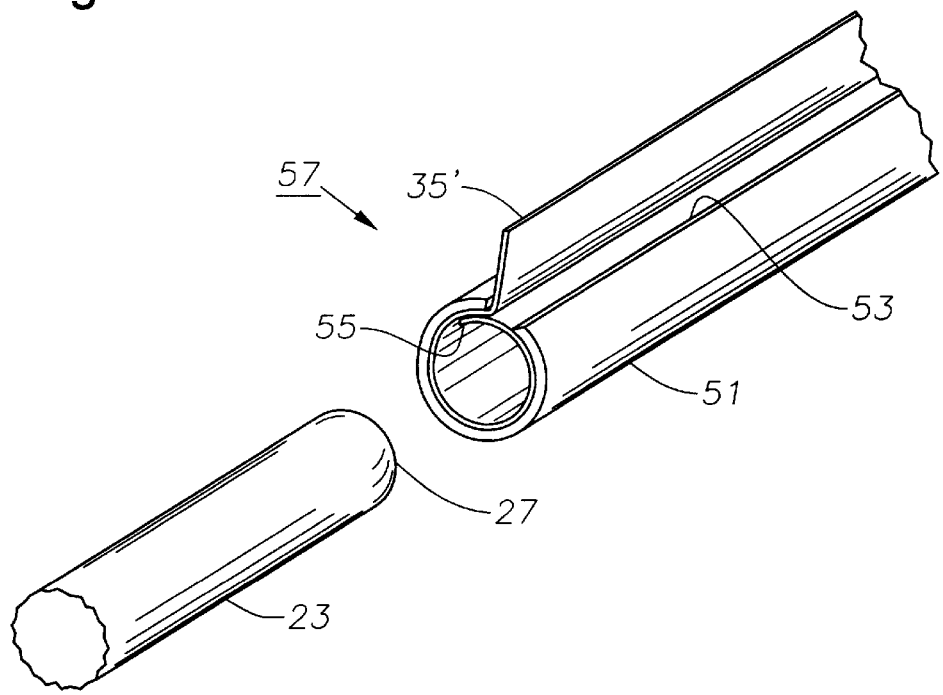
FIG. 3 is an exploded isometric view of a second embodiment of the heat pipe joint of FIG. 1.

Referring now to FIG. 3, a second embodiment of the invention is shown. In this version, a simple retainer 51 is incorporated into the design to ease assembly. Retainer 51 is a hollow cylindrical boss having a greater wall thickness than a thickness of extension 35'. Retainer 51 has an axial slit 53 through which extension 35' protrudes. The end or edge of extension 35' is wound into a coil or spiral 55 and fits snugly within the bore of retainer 51. Axial translation of heat pipe 23 along the axis of retainer 51 is required to connect or disconnect joint 57 (shown disconnected in FIG. 3). The fit between heat pipe 23, coil 55 and retainer 51 is an intimate and thermally efficient contact. The cylindrical shape of heat pipe 23 permits its rotation relative to the axis of retainer 51. If this axis is coincident with the hinge of the notebook computer (not shown), then joint 57 may be used as a thermal hinge joint.

Figure 4:
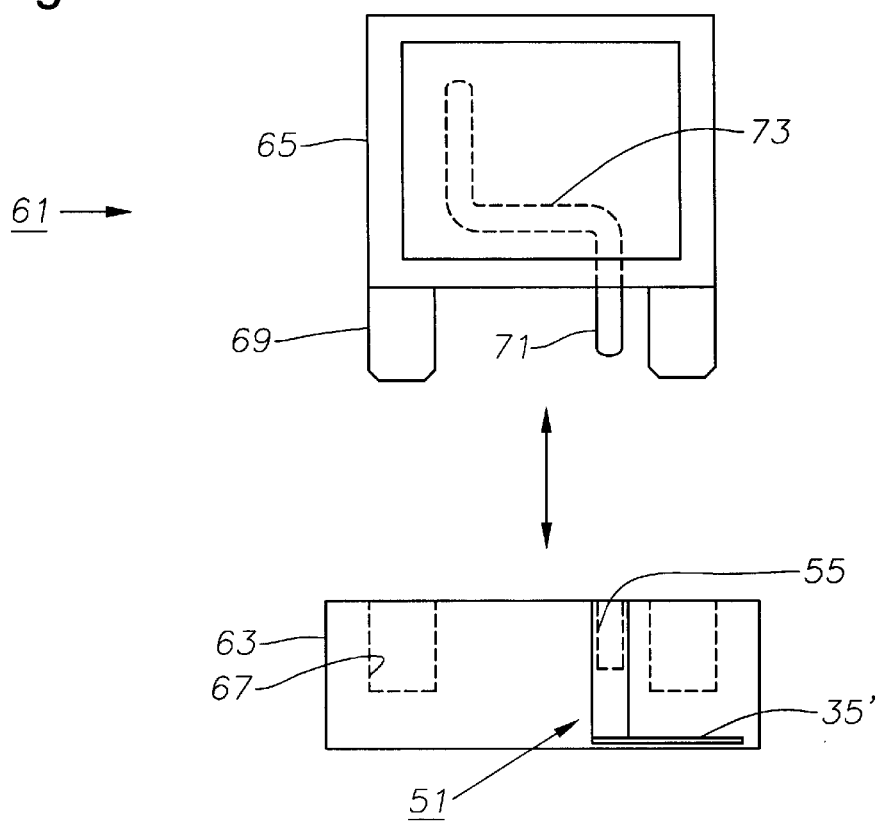
FIG. 4 is a schematic drawing of a computer with the heat pipe joint of FIG. 3.

As shown in FIG. 4, one simple use or application for joint 57 of the second embodiment is in a computer 61 having a base 63 and stationary, nonrotatable display 65. Base 61 has sockets 67 for receiving the legs 69 protruding from display 65. The lower end 71 of a heat pipe 73 may be axially inserted into retainer 51 which is constructed as described above. End 71 is closely received by coil 55, which collects heat from extension 35' and an associated chip (not shown). Joint 57 may also be used in applications requiring a pivotal cover or display (not shown), by rotating heat pipe 90 degrees clockwise such that lower end 71 is substantially aligned with the hinge.

The invention has several advantages. These hinge joints do not require a separate mechanical hinge to perform the function of transferring heat from the base to the cover. In addition, these solutions do not require additional fasteners or other hardware to secure the heat pipe to the pivot structure. As a result, a simple, more economical joint may be manufactured and assembled. The joints have the added benefit of being easily or quickly attachable and detachable. These two designs may be combined and used in any combination or arrangement that requires a quick-connect or release heat pipe hinge joint. Each of the embodiments provide a fit with a maximum diametrical clearance on the order of 25 micrometers at the interface.

While the invention has been shown or described in only some of its forms, it should be apparent to those skilled in the art that it is not so limited, but is susceptible to various changes without departing from the scope of the invention. For example, the same result could be achieved with a two-piece cylinder having a fastening or joining member for maintaining a tight fit around the heat pipe.

We claim:

1. An apparatus, comprising:
   a component which generates heat;
   a heat dissipation device located remotely relative to the component and having a cylindrical formation on one end;
   a cylindrical heat pipe having a first end connected to the component and a second end in engagement with the formation, the formation closely receiving the second end and allowing axial movement and rotation relative thereto; wherein
   the heat pipe conducts heat away from the component, through the heat pipe and the formation, and into the heat dissipation device such that the heat of the component is dissipated remotely relative to the component; and wherein
   the formation of the heat dissipation device has a curved lip along a distal edge.

2. The apparatus of claim 1 wherein the second end of the heat pipe is radially pressed into the formation to form a joint.

3. The apparatus of claim 1 wherein the heat dissipation device is formed from a material selected from the group consisting of copper, aluminum and carbon composite.

4. An apparatus, comprising:
   a component which generates heat;
   a heat dissipation device located remotely relative to the component and having a cylindrical formation on one end;
   a cylindrical heat pipe having a first end connected to the component and a second end in engagement with the formation, the formation closely receiving the second end and allowing axial movement and rotation relative thereto;
   a retainer for capturing the formation of the heat dissipation device, the retainer having an axial slit through which the heat dissipation device extends; and wherein
   the heat pipe conducts heat away from the component, through the heat pipe and the formation, and into the heat dissipation device such that the heat of the component is dissipated remotely relative to the component.

5. The apparatus of claim 4 wherein the formation comprises a coil.

6. The apparatus of claim 4 wherein the retainer comprises a tube which is coaxial with the formation.

7. The apparatus of claim 4 wherein the second end of the heat pipe is axially pressed into the formation to form a joint.

8. The apparatus of claim 4 wherein the formation has a maximum diametrical clearance of 25 micrometers where it receives the second end of the heat pipe.

9. A notebook computer, comprising:
   a base;
   a cover pivotally mounted to the base along a hinge;
   an electrical component mounted to the base;
   a cylindrical heat pipe having a first end connected to the component and a second end adjacent to the hinge, such that a portion of the heat pipe is substantially coaxial with the hinge;
   a spreader plate mounted to the cover and having a cylindrical formation on one end that is substantially coaxial with the hinge, the formation closely receiving the portion of the heat pipe and allowing rotation relative thereto to form a joint; and wherein
   the formation of the spreader plate has a curved lip on one end which curves away from the spreader plate to define an axial slot therebetween for radially receiving the portion of the heat pipe.

10. The computer of claim 9 wherein the spreader plate is formed from a material selected from the group consisting of copper, aluminum and carbon composite.

11. A notebook computer, comprising:
    a base;
    a cover pivotally mounted to the base along a hinge;
    an electrical component mounted to the base;
    a cylindrical heat pipe having a first end connected to the component and a second end adjacent to the hinge, such that a portion of the heat pipe is substantially coaxial with the hinge;
    a spreader plate mounted to the cover and having a cylindrical formation on one end that is substantially coaxial with the hinge, the formation closely receiving the portion of the heat pipe and allowing rotation relative thereto to form a joint; and
    a tubular retainer for capturing the formation of the spreader plate, the retainer having an axial slit through which the spreader plate extends.

12. The computer of claim 11 wherein the formation comprises a coil.

13. The computer of claim 11 wherein the second end of the heat pipe is axially pressed into the formation to form a joint.

* * * * *